(12) United States Patent
Garg et al.

(10) Patent No.: US 12,543,095 B2
(45) Date of Patent: Feb. 3, 2026

(54) SYSTEM AND METHOD FOR ADAPTIVE CELL SEARCH BASED ON ARTIFICIAL INTELLIGENCE MODEL OF AN ELECTRONIC DEVICE

(71) Applicant: SAMSUNG ELECTRONICS CO., LTD., Suwon-si (KR)

(72) Inventors: Shivank Garg, Meerut (IN); Amit Mittal, Rohtak (IN); Deepak Srivastava, Greater Noida (IN); Gaurav Kumar Tiwary, Gurgaon (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 249 days.

(21) Appl. No.: 18/223,826

(22) Filed: Jul. 19, 2023

(65) Prior Publication Data

US 2024/0147336 A1  May 2, 2024

Related U.S. Application Data

(63) Continuation of application No. PCT/KR2023/008946, filed on Jun. 27, 2023.

(30) Foreign Application Priority Data

Oct. 28, 2022  (IN) .............................. 202211061621

(51) Int. Cl.
*H04W 36/32* (2009.01)
*H04W 36/30* (2009.01)

(52) U.S. Cl.
CPC ....... *H04W 36/322* (2023.05); *H04W 36/302* (2023.05)

(58) Field of Classification Search
CPC ............. H04W 36/322; H04W 36/302; H04W 36/0085; H04W 36/00835
See application file for complete search history.

(56) References Cited

U.S. PATENT DOCUMENTS 10,149,223 B2  12/2018  Guo
11,812,316 B2  11/2023  Kumar et al.
(Continued)

FOREIGN PATENT DOCUMENTS

CN  108476445 A  8/2018
CN  107295579 B  6/2020
(Continued)

OTHER PUBLICATIONS

Alkurd, Rawan, Ibrahim Y. Abualhaol, and Halim Yanikomeroglu. "Personalized resource allocation in wireless networks: An AI-enabled and big data-driven multi-objective optimization." IEEE Access 8 (2020): 144592-144609. (Year: 2020).*
(Continued)

*Primary Examiner* — Sharad Rampuria
(74) *Attorney, Agent, or Firm* — Sughrue Mion, PLLC

(57) ABSTRACT

A method for selecting a target cell by a user equipment (UE), includes: detecting a movement of the UE based on a change in a location of the UE and a change in a measured signal power of a serving cell; determining personalized data of a user based on a plurality of user contextual parameters; predicting a destination of the user, and one or more target cells across a path of the user to the destination based on the determined personalized data of the user and the detected movement of the UE; and selecting the target cell from the one or more target cells, based on an artificial intelligence (AI) model. The AI model is configured to update weights of one or more network quality parameters.

18 Claims, 19 Drawing Sheets

(56) References Cited

U.S. PATENT DOCUMENTS

| | | |
|---|---|---|
| 11,963,051 B2 | 4/2024 | Umapathy et al. |
| 2015/0036598 A1 | 2/2015 | Kilpatrick, II et al. |
| 2015/0036663 A1 | 2/2015 | Kilpatrick et al. |
| 2015/0237546 A1* | 8/2015 | Lin .................. H04W 36/00835 455/436 |
| 2015/0319668 A1* | 11/2015 | Guo ...................... H04W 72/51 370/331 |
| 2016/0309298 A1 | 10/2016 | Dupray et al. |
| 2017/0289875 A1 | 10/2017 | Cui et al. |
| 2018/0149486 A1* | 5/2018 | Spears ................ G01C 21/3484 |
| 2020/0112899 A1 | 4/2020 | Mysore Annaiah et al. |
| 2021/0007023 A1 | 1/2021 | Umapathy et al. |
| 2022/0264411 A1 | 8/2022 | Zhang et al. |
| 2022/0386184 A1 | 12/2022 | Li et al. |

FOREIGN PATENT DOCUMENTS

| | | |
|---|---|---|
| CN | 112203334 A | 1/2021 |
| CN | 114390442 A | 4/2022 |
| CN | 114616868 B | 10/2024 |
| EP | 2717625 A1 | 4/2014 |
| EP | 4054244 A1 | 9/2022 |
| WO | 2022/045841 A1 | 3/2022 |

OTHER PUBLICATIONS

International Search Report and Written Opinion (PCT/ISA/220, PCT/ISA/210, and PCT/ISA/237) issued on Sep. 14, 2023 by International Search Authority in corresponding International Application No. PCT/KR2023/008946.

Tanveer, J., et al. "An Overview of Reinforcement Learning Algorithms for Handover Management in 5G Ultra-Dense Small Cell Networks", MPDI, Appl. Sci. 2022, 12, 426. 26 pages. https://doi.org/10.3390/app12010426.

Extended European Search Report dated Sep. 5, 2025, issued by the European Patent Office in European Application No. 23882816.4.

* cited by examiner

SYSTEM AND METHOD FOR ADAPTIVE CELL SEARCH BASED ON ARTIFICIAL INTELLIGENCE MODEL OF AN ELECTRONIC DEVICE

CROSS-REFERENCE TO RELATED APPLICATIONS

This application is a by-pass continuation application of International Application No. PCT/KR2023/008946, filed on Jun. 27, 2023, which is based on and claims priority to Indian Patent Application No. 202211061621, filed on Oct. 28, 2022, in the Indian Intellectual Property Office, the disclosures of which are incorporated by reference herein their entireties.

BACKGROUND

1. Field

The disclosure relates to a method and a system for adaptive cell search based on an artificial intelligence (AI) model of an electronic device. In particular, the disclosure relates to a method and a system for cell selection during user equipment (UE) movement based on updated dynamic weights of the AI model for network quality parameters.

2. Description of Related Art

Cell reselection is a mechanism to change cells after a user equipment (UE) is settled on a cell and stays in idle mode. The UE gets connected to a cell which has the best condition among all the cells to which the UE is allowed to connect. Further, a handover is a process of transferring an ongoing call or a data session from one channel (connected to a core network) to another channel.

In fifth generation (5G) new radio (NR) system, reference signals are measured to perform cell selection, cell reselection and handover etc. After the reference signals are measured, the UE may have Reference Signal Received Power (RSRP) of the cell. The RSRP is a linear average of reference signal power (in Watts) measured over a specified bandwidth (in number of UEs). The UE may perform the measurement for a serving cell at every Discontinuous Reception (DRX) cycle and check if the measurement of the serving cell satisfies the cell selection criteria. If the UE successfully finds a cell meeting the criteria within a certain amount of trial, the stays at the cell. In contrast, if the UE does not find the serving cell within a certain amount of trials, the UE may initiate the measurement/evaluation for all the neighbor cells.

FIG. 1 shows an example scenario of a cell reselection and handover process while the UE is in movement, according to a state-of-the-art. As can be seen a user is travelling from point x to pointy, at point 1 (09:00 AM), UE 101 is camped to gNB1 as a current serving cell. Then, at point 2 (09:10 AM), UE 101 reselects to gNB2 as a next current serving cell, and at point 3 (09:25 AM), UE 101 connects to gNB3 as a further next serving cell. UE 101 performs a measurement at every point as it moves. The reselection/handover will be performed if UE 101 gets a cell having signal strength as a next serving cell which has better signal strength than that of the current serving cell.

Thus, the cell selection may depend on majorly two factors radio signal quality and block error rate (BLER). Further, a call drop occurs due to radio link failure. Further, a failure at lower layers of a stack, i.e. at a radio frequency (RF) layer or a physical layer, is due to higher frequency off-set or time offset, poor interference conditions on channels between the UE and a base station.

FIG. 2 shows an another example scenario of the cell reselection and handover process while the UE is in movement, according to a state-of-the-art. As seen in FIG. 2, UE 101 moves from Point 1 to 5 through Point 2, 3 and 4. At point 1, UE 101 is connected to gNB1. At point 2, UE 101 measures RSRP of neighbor cells gNB2 and gNB3. As gNB3 has better RSRP, UE 101 will connect to gNB3. Likewise, at point 3, UE 101 connects to gNB5.

FIG. 3 shows a load on gNB2 and gNB3 for the scenario of FIG. 2, according to a state-of-the-art. As shown in FIG. 3 ("(a)"), at gNB2, UE 101 is able to receive 6 TB (Transport Block) of data in 110 ms. In FIG. 3 ("(b)"), at gNB3, UE 101 is able to receive only 3 TB of data in 100 ms, where 1 TB=8448 bits. FIG. 4 shows data transmission of TBs between a UE and multiple base stations, i.e. gNB4 and gNB5, for the scenario of FIG. 2, according to a state-of-the-art. As shown in FIG. 4 ("(a)"), gNB2 is able to send 4 TB of different data. In FIG. 4 ("(b)"), gNB5 is able to send only 2 TB of different data. After 28 ms, gNB4 sends 4 TB data and gNB5 sends 2 TB data. Therefore, a throughput of gNB4 is greater than a throughput of gNB5. The reselection criteria and reselection action are shown in table 1 below.

TABLE 1

| Reselection Criteria | Reselection Action |
| --- | --- |
| $S_{rxlev}$ (gNB1) > $S_{rxlev}$ (eNB1) & NR has high priority than LTE. | UE reselects to gNB1. |
| $S_{rxlev}$ (gNB1) < $Thres_{serving}$ $S_{rxlev}$ (gNB3) > $S_{rxlev}$ (gNB2) | UE reselects to gNB3. |
| $S_{rxlev}$ (gNB3) < $Thres_{serving}$ $S_{rxlev}$ (gNB5) > $S_{rxlev}$ (gNB4) | UE reselects to gNB5. |

Thus, based on above table 1, following issues need to be addressed:
- UE does not consider a cell size as a parameter for connecting to a base station, resulting in high battery drainage.
- UE does not consider network loads of cells as criteria for the cell reselection, which results in a low throughput.
- UE does not measure RF link balance for reselection criteria, which results in bad user experience affecting a throughput and voice quality during a call.

Accordingly, when a user is moving on a certain path, a serving cell's power gets smaller than a threshold value. The UE performs cell selection on a neighbor cell on the basis of 'cell quality parameters' such as network load, RF link imbalance, Reference Signal Received Power (RSRP), a cell size, where all the parameters are assigned to fixed weights based on these parameters. This results in a low throughput, a high battery drain, a low voice quality, a connection with a highly loaded cell etc. Additional issues on the conventional method of cell selection need to be addressed as below:
- Weights of network parameters are fixed and do not consider a user's personalized behavior. This results in a low throughput when a network quality is given higher weights.
- Higher number of call drops/interference may occur when a lower weight is given to the RF link imbalance.
- Battery drainage may occur when weights are not updated per an available battery strength.
- Use of network resources is not optimized.

FIG. 5 shows another example scenario in cell (re) selection criteria and cell selection action. FIG. 5 shows two example scenarios: in scenario 1, a user is in voice call, and, in scenario 2, the UE of the user has a low battery. The (re)selection criteria and (re)selection action are shown in table 2 below.

TABLE 2

| User Scenario | Selection Criteria | Selection Action | Problem |
|---|---|---|---|
| User on active Voice call. | W(gNB2) > W(gNB1) | UE connects to gNB2. | User should connect to gNB3 as voice call Quality is influenced mostly by RF link quality as RF link quality of gNB3 is better than gNB2. |
| User battery is low. | W(gNB2) > W(gNB1) | UE connects to gNB2. | User need to connect to eNB1(LTE cell) to reduce no. of reselections as user's mobile battery is low. |

Thus, based on above table 2, the following issues need to be addressed:

For cell mobility, weights assigned to network parameters are not changed dynamically based on the user's personalized behavior.

Low throughput when RF link imbalance is assigned to a higher weight, but throughput requirement is high.

Higher number of call drop/noise may occur when RF link imbalance is assigned to a lower weight, but throughput requirement is low.

High battery drainage when weights are not updated based on available battery strength.

Use of network resources may not be optimized.

Therefore, improvement may be required to solve or mitigate the above-mentioned problems.

SUMMARY

This summary is provided to introduce a selection of concepts in a simplified format that are further described in the detailed description of the disclosure. This summary is not intended to identify key or essential features of the disclosure, nor is it intended for determining the scope of the disclosure.

According to an aspect of the disclosure, a method for selecting a target cell by a user equipment (UE), includes: detecting a movement of the UE based on a change in a location of the UE and a change in a measured signal power of a serving cell; determining personalized data of a user based on a plurality of user contextual parameters; predicting a destination of the user, and one or more target cells across a path of the user to the destination based on the determined personalized data of the user and the detected movement of the UE; and selecting the target cell from the one or more target cells, based on an artificial intelligence (AI) model. The AI model is configured to update weights of one or more network quality parameters, based on at least one of: the determined personalized data, information on the one or more target cells, a mapping of the target cell from the one or more target cells and the serving cell across the path of the user to the destination.

According to another aspect of the disclosure, a UE for selecting a target cell, includes one or more processors configured to: detect a movement of the UE based on a change in a location of the UE and a change in a measured signal power of a serving cell; determine personalized data of a user based on a plurality of user contextual parameters; predict a destination of the user, and one or more target cells across a path of the user to the destination based on the personalized data and the detected movement of the UE; and select the target cell from one or more target cells based on a trained AI model that updates a weight for one or more network quality parameters based on at least one of the personalized data, information about one or more target cells, and a mapping of the target cell from the one or more target cells and the serving cell, across the path of the user to the destination based on training data and the prediction.

To further clarify the advantages and features of the present disclosure, a more particular description of the disclosure will be rendered by reference to specific embodiments thereof, which is illustrated in the appended drawing. It is appreciated that these drawings depict only typical embodiments of the disclosure and are therefore not to be considered limiting its scope. The disclosure will be described and explained with additional specificity and detail with the accompanying drawings.

BRIEF DESCRIPTION OF DRAWINGS

The above and other aspects, features, and advantages of certain embodiments of the disclosure will be more apparent from the following description taken in conjunction with the accompanying drawings, in which.

Figure 1:
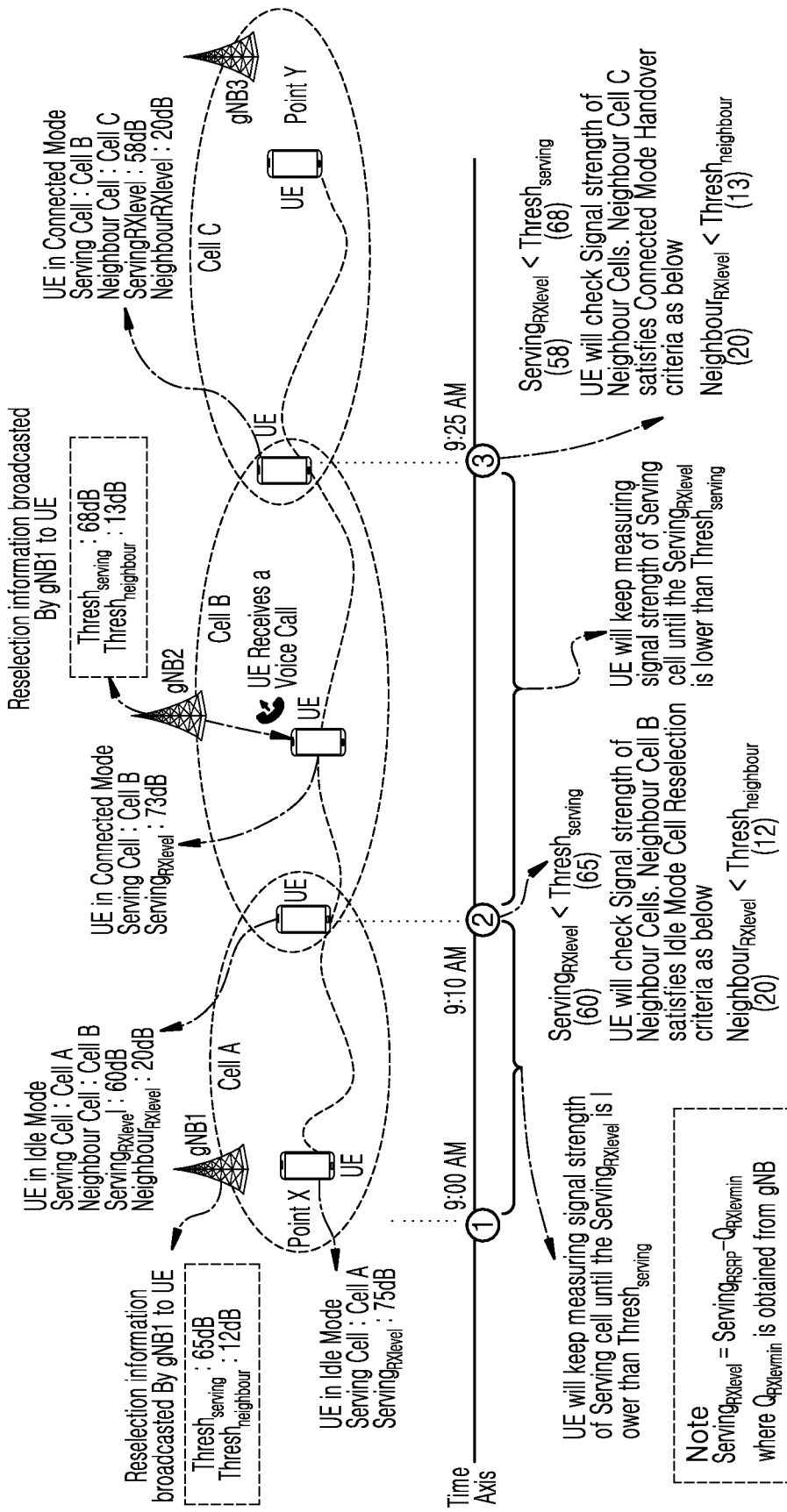
FIG. 1 shows an example scenario of a cell reselection and handover process while the UE is in movement, according to a state-of-the-art.
Figure 2:
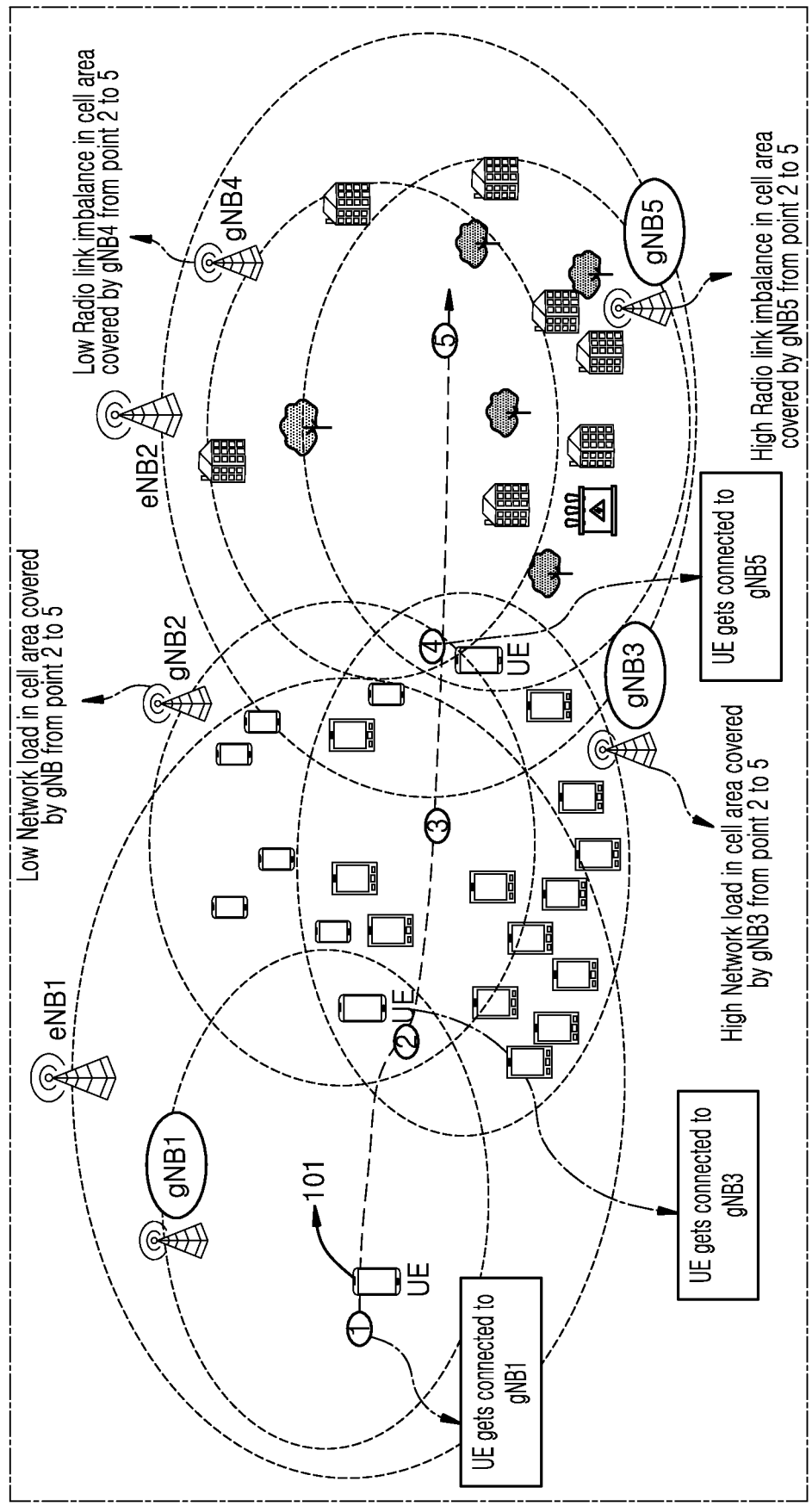
FIG. 2 shows another an example scenario of the cell reselection and handover process while the UE is in movement, according to according to a state-of-the-art.
Figure 3:
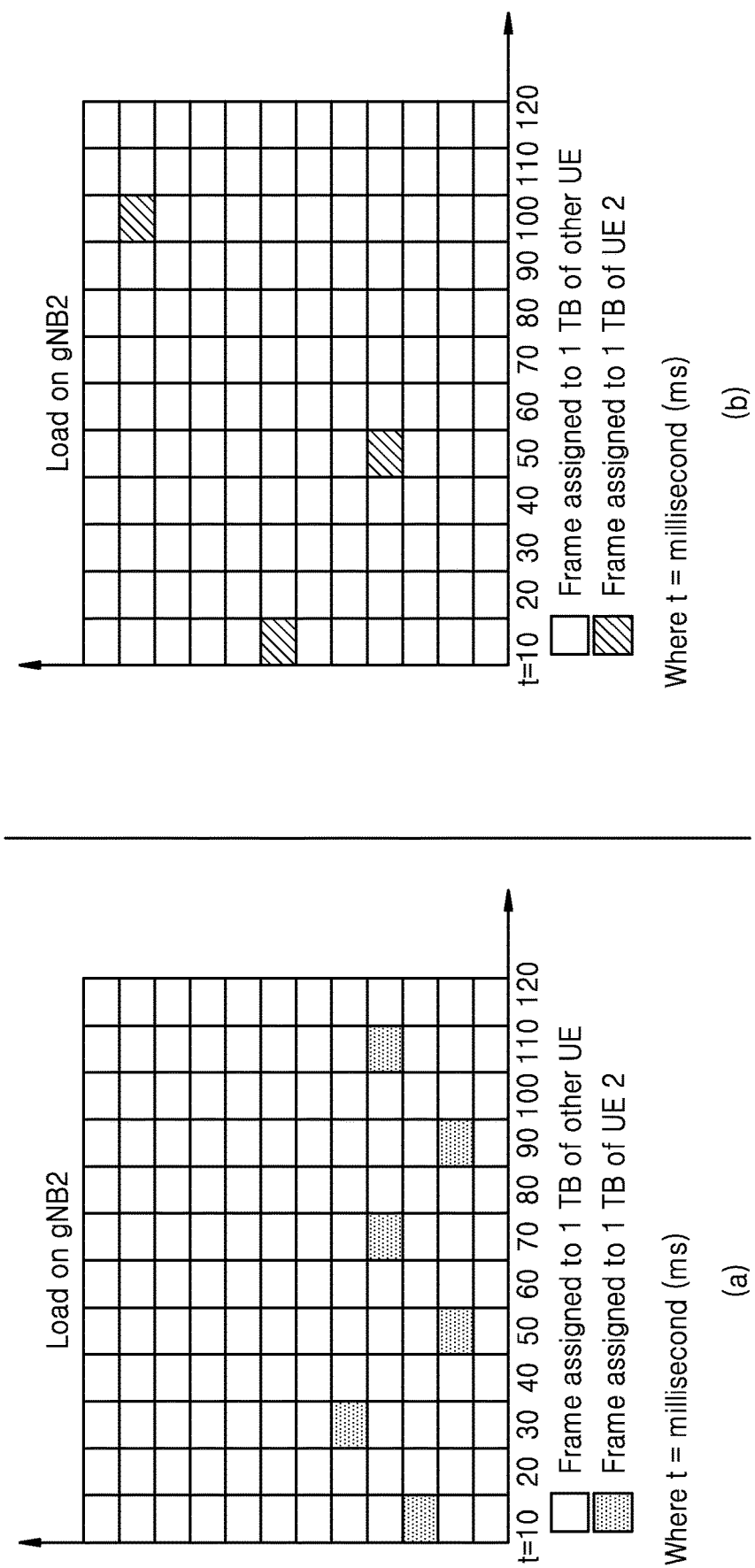
FIG. 3 shows a load on gNB2 and gNB3 for the scenario of FIG. 2, according to according to a state-of-the-art.
Figure 4:
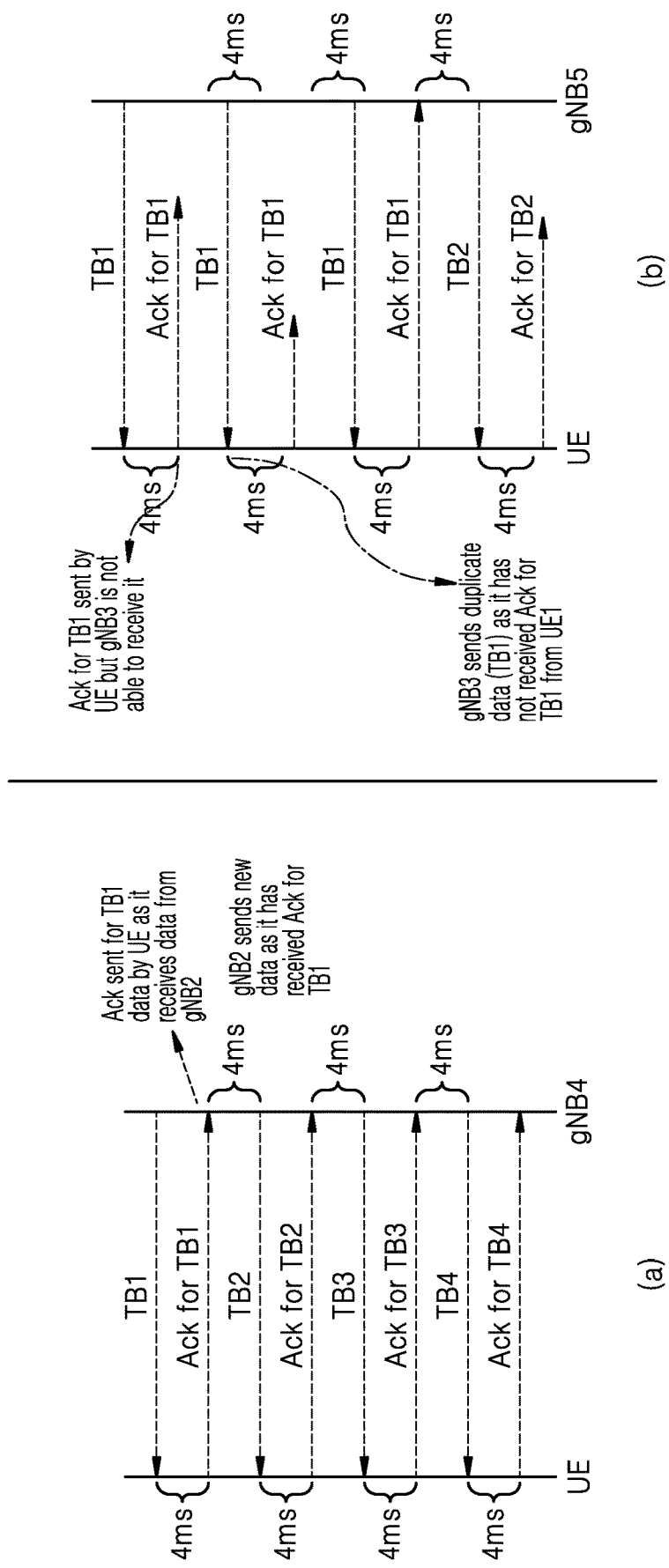
FIG. 4 shows data transmission of transport blocks between a UE and various base station i.e. gNB4 and gNB5 for the scenario of FIG. 2, according to a state-of-the-art.
Figure 5:
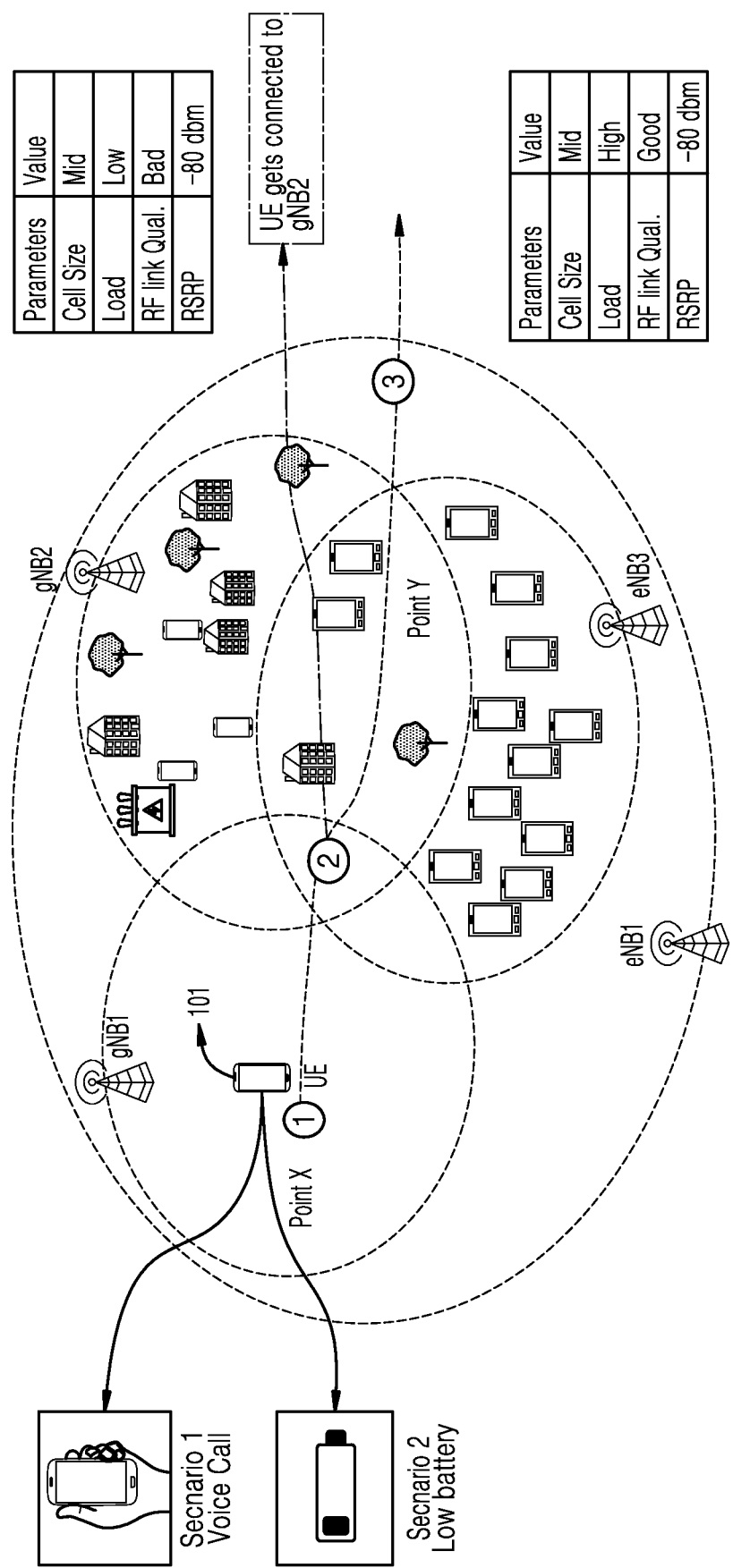
FIG. 5 shows another example scenario in cell selection criteria and cell selection, according to according to a state-of-the-art.

Further, skilled artisans will appreciate that elements in the drawings are illustrated for simplicity and may not have been necessarily been drawn to scale. For example, the flow charts illustrate the method in terms of the most prominent operations involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

It should be understood at the outset that although illustrative implementations of the embodiments of the disclosure are illustrated below, the present disclosure may be implemented using any number of techniques, whether currently known or in existence. The disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching, and illuminating some embodiments and their specific features and elements and does not limit, restrict, or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more elements are REQUIRED." As used herein, an expression "at least one of" preceding a list of elements modifies the entire list of the elements and does not modify the individual elements of the list. For example, an expression, "at least one of a, b, and c" should be understood as including only a, only b, only c, both a and b, both a and c, both b and c, or all of a, b, and c.

Unless otherwise defined, all terms, and especially any technical and/or scientific terms, used herein may be taken to have the same meaning as commonly understood by one having ordinary skill in the art.

Embodiments of the present disclosure will be described below in detail with reference to the accompanying drawings.

The disclosure relates to a method and a system for selecting a target cell by a user equipment (UE), for example, while a user equipment (UE) is moving. In particular, the disclosure relates to the method and the system for cell selection, while the UE is moving, based on weights of network quality parameters, which are dynamically updated by an (on-device) AI model. The disclosure relates to a method to perform handover in a wireless network and prediction of a destination of the user, one or more target cells across a path of the user to the destination based on the user personalized data and a movement of the UE.

The method further discloses dynamically updating the weights by the(on-device) AI model based on the user personalized data while the movement of the UE and a network quality parameter. The method further discloses a method for selection of new cells by the UE based on the dynamically updated weights to achieve maximum throughput.

Figure 6:
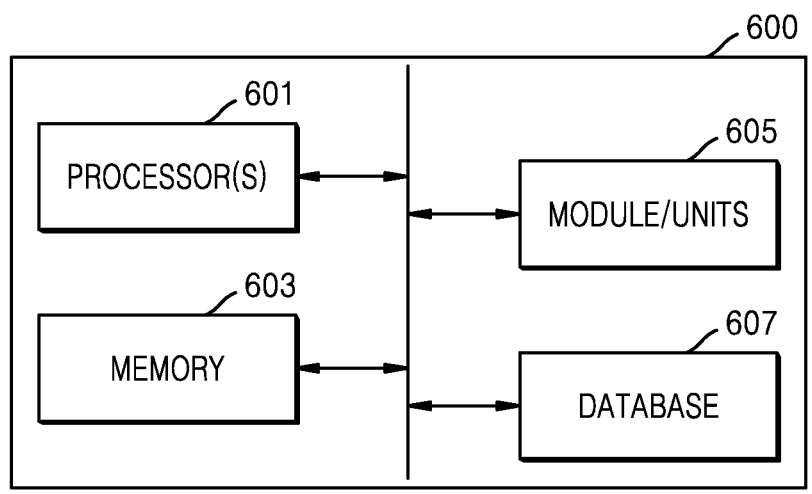
FIG. 6 illustrates a general architecture of the UE, in accordance with an embodiment of the disclosure.
Figure 7:
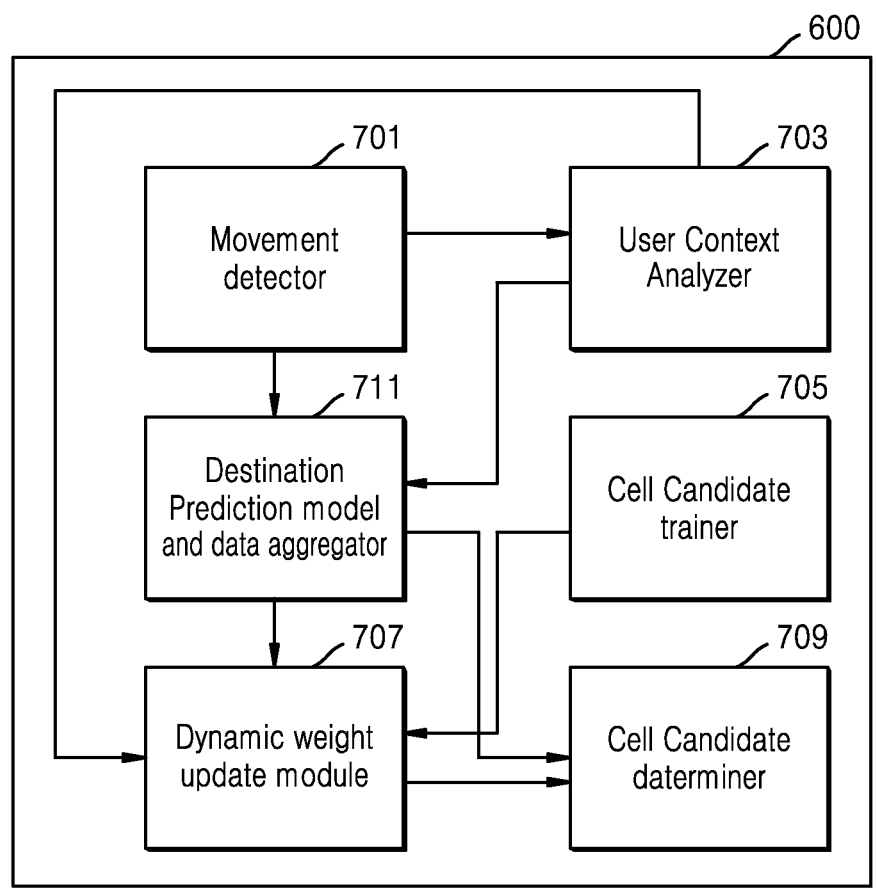
FIG. 7 illustrates a detailed block diagram of the electronic device in accordance with an embodiment of the disclosure.

FIG. 6 illustrates a general architecture of the UE, in accordance with an embodiment of the disclosure. According to an embodiment, the UE 600 may include at least one or more processors 601, a memory 603, module/units 605, and a database 607. FIG. 7 illustrates a detailed block diagram of the electronic device in accordance with an embodiment of the disclosure. The electronic device 100 may include a movement detector 701, a user context analyzer 703, a destination prediction model and data aggregator 711, a cell candidate trainer 705, a dynamic weight update module 707, and a cell candidate determiner 709. The reference numerals may have been kept same for the similar components throughout the disclosure for the ease of understanding.

As an example, the user equipment 600 may correspond to various devices such as a personal computer (PC), a tablet PC, a personal digital assistant (PDA), a smartphone, a head mounted device, a wearable device, a palmtop computer, a laptop computer, a desktop computer, a communications device, dashboard, navigation device, a computing device, or any other machine capable of executing a set of instructions.

In an example, the processor 601 may be a single processing unit or a number of units, all of which could include multiple computing units. The processor 601 may be implemented as one or more microprocessors, microcomputers, microcontrollers, digital signal processors, central processing units, logical processors, virtual processors, state machines, logic circuitries, and/or any devices that manipulate signals based on operational instructions. Among other capabilities, the processor 601 is configured to fetch and execute computer-readable instructions and data stored in the memory 603. In an alternate embodiment, the modules, units, components as shown in FIG. 7 include one or more processors.

The memory 603 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

In an example, the module(s), engine(s), and/or unit(s) 605 may include a program, a subroutine, a portion of a program, a software component, and a hardware component capable of performing a stated task or function. As used herein, the module(s), engine(s), and/or unit(s) 205 may be implemented on a hardware component such as a server independently of other modules, or a module can exist with other modules on the same server, or within the same program. The module (s), engine(s), and/or unit(s) may be implemented on a hardware component such as processor one or more microprocessors, microcomputers, microcontrollers, digital signal processors, central processing units, state machines, logic circuitries, and/or any devices that manipulate signals based on operational instructions. The module (s), engine(s), and/or unit(s) 605 when executed by the processor(s) may be configured to perform any of the described functionalities.

In another example, the database 607 may be implemented with integrated hardware and software. The hardware may include a hardware disk controller with programmable search capabilities or a software system running on general-purpose hardware. The examples of database are, but not limited to, in-memory database, cloud database, distributed database, embedded database and the like. The database amongst other things, serves as a repository for storing data processed, received, and generated by one or more of the processors, and the modules/engines/units.

The modules/engines/units 605 may be implemented with an AI module that may include a plurality of neural network layers. Examples of neural networks are, but are not limited to, convolutional neural network (CNN), deep neural network (DNN), recurrent neural network (RNN), Restricted Boltzmann Machine (RBM). The learning technique is a method for training a predetermined target device (for example, a robot) using a plurality of learning data to cause, allow, or control the target device to make a determination or prediction. Examples of learning techniques are, but are not limited to, supervised learning, unsupervised learning, semi-supervised learning, or reinforcement learning. At least one of a plurality of CNN, DNN, RNN, RMB models and the like may be implemented to achieve execution of the present subject matter's mechanism through the AI model.

A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. A detailed explanation of each of the aforesaid component as shown in FIG. 7 will be explained in detail in the forthcoming paragraphs. Further, the working of the electronic device 600 will be explained with respect to FIG. 6. The reference numerals are kept the same in the disclosure wherever applicable for the ease of explanation.

Figure 8:
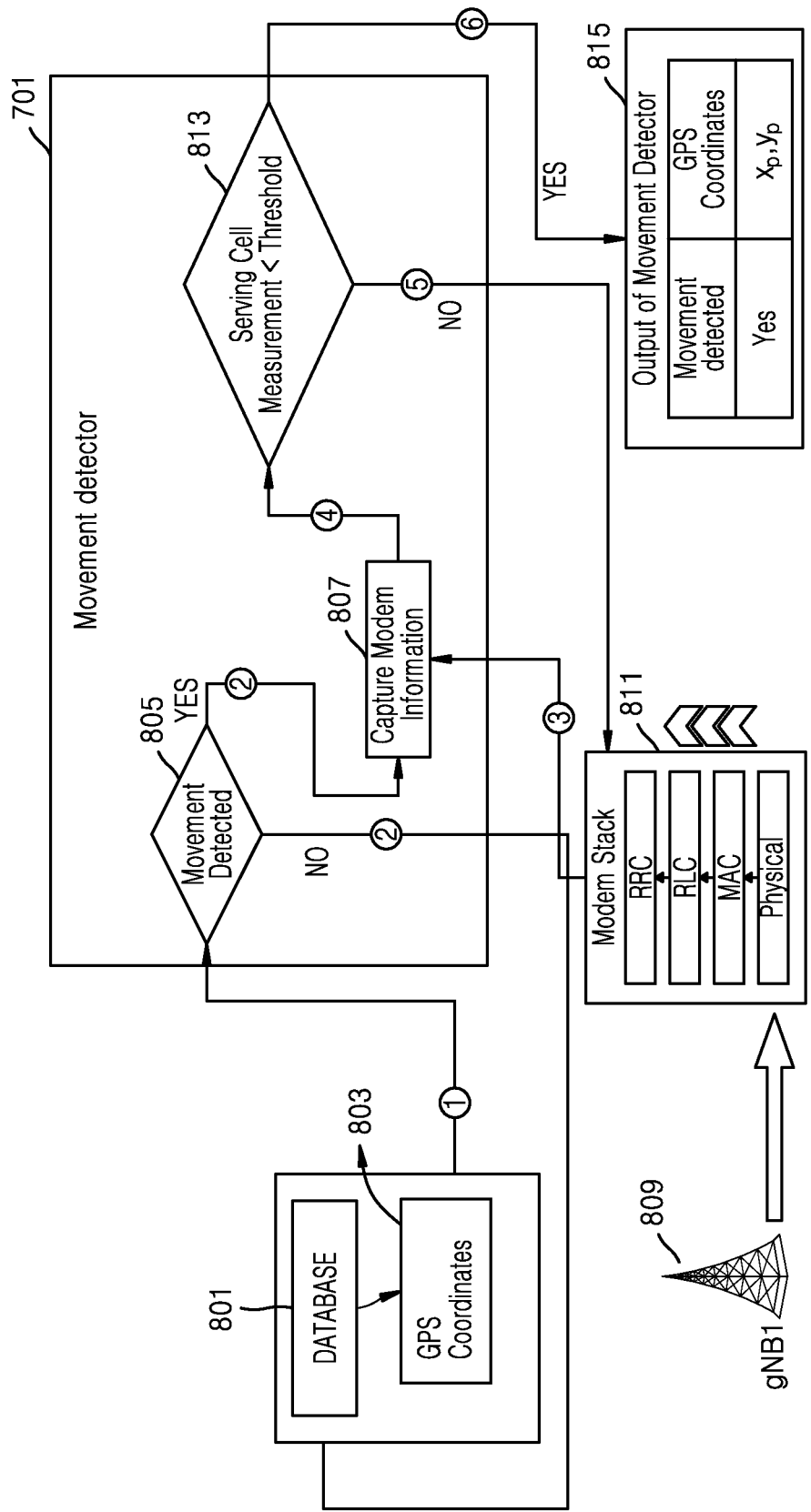
FIG. 8 shows a working of the movement detector, according to an embodiment of the disclosure.
Figure 9:
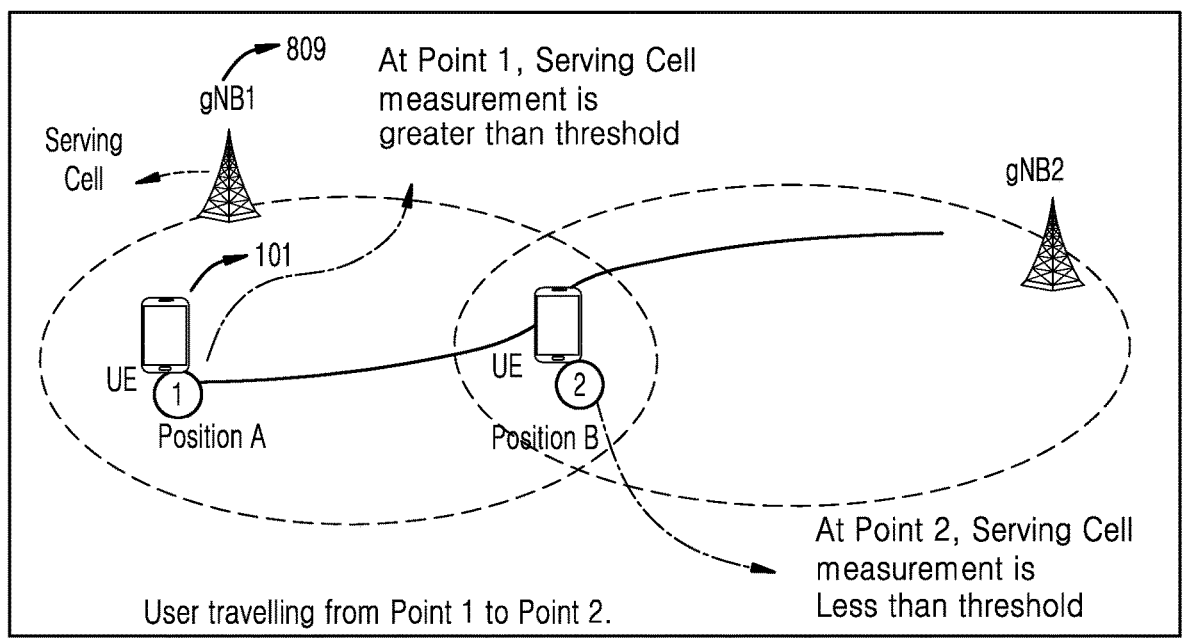
FIG. 9 shows an example scenario where the UE is in movement, according to an embodiment of the disclosure.

According to an embodiment of the disclosure, the movement detector 701 may be configured to detect a movement of UE 101. FIG. 8 shows a working of the movement detector, according to an embodiment of the disclosure. For explaining the working of the movement detector 701 consider an example scenario of FIG. 9. FIG. 9 shows an example scenario where UE 101 is in movement, according to an embodiment of the disclosure. In FIG. 9, UE 101 is initially at position A. The movement detector 701 may be configured to track a geographical location of UE 101 during the movement of UE 101 based on sensor data. As an example, the geographical location may be obtained from sensors like GPS sensors of UE 101 or any other sensors data that is capable of providing GPS coordinates. In a non-limiting example, the geographical location corresponds GPS coordinates of the UE.

A GPS manager 801 of UE 101 transmits GPS coordinates 803 of UE 101 to the movement detector 701. Then, the movement detector 701 may be configured to determine at block 805 whether there is a change in the location of UE 101 based on the received GPS coordinates. If there is no change, the movement detector 701 detects that there is no movement, and UE 101 is idle. However, if the movement detector 701 detects that there is a change in the location of UE 101, i.e., the GPS coordinate has changed. For example, for (initial) position A, the GPS coordinates may be determined as $(x_i, y_i)$ and for the changed position i.e. for position B the GPS coordinates may be determined as $(x_p, y_p)$.

According to an embodiment, when the movement detector 701 detects that there is a change in the location of UE 101, the movement detector 701 may be further configured to obtain signal power of the serving cell measured by a network at block 807. As an example, the obtained signal power corresponds to a Reference Signal Received Power (RSRP) value of a serving cell 809. According to an embodiment, a value of the obtained signal power may be obtained through a modem 811. For example, the measurement information could be captured from modem stack of the modem 811.

UE 101 continuously measures the serving cell signal strength of the serving cell 809. Thereafter, at block 813, the movement detector 701 may be configured to determine a change in the measured signal power of the serving cell by comparing the measured signal power of the serving cell with a threshold value. If the measured signal power of the serving cell is higher than a threshold value, then the movement detector 701 determines that UE 101 is in good coverage area. Further, if the measured signal power of the serving cell is lower than a threshold value, then the movement detector 701 determines that a cell mobility event is required. The cell mobility event is an event when UE 101 moves from one cell to another cell. The movement detector 701 outputs GPS coordinate of UE 101 of that geographical location as shown in the block 815.

In FIG. 9, at point 1, the serving cell measurement of UE 101 (signal power of the serving cell measured at UE 101) is greater than the threshold and while UE 101 is travelling from point 1 to point 2, at point 2 the serving cell measurement of UE 101 is less than the threshold. Thus, the movement detector 701 determines a requirement of the cell mobility event based on the change in the location of the UE 101 and the change in the measured signal power of the serving cell. Thus, the movement detector 701 detects the movement of UE 101 based on the determination of the change in the measured signal power of the serving cell and the tracked geographical location of UE 101. According to an embodiment, the tracked geographical location of UE 101 during the movement of UE 101 is stored in a memory.

The GPS coordinate of UE 101 (as shown in the block 815) will be utilized as an input by the user context analyzer 703.

Figure 10:
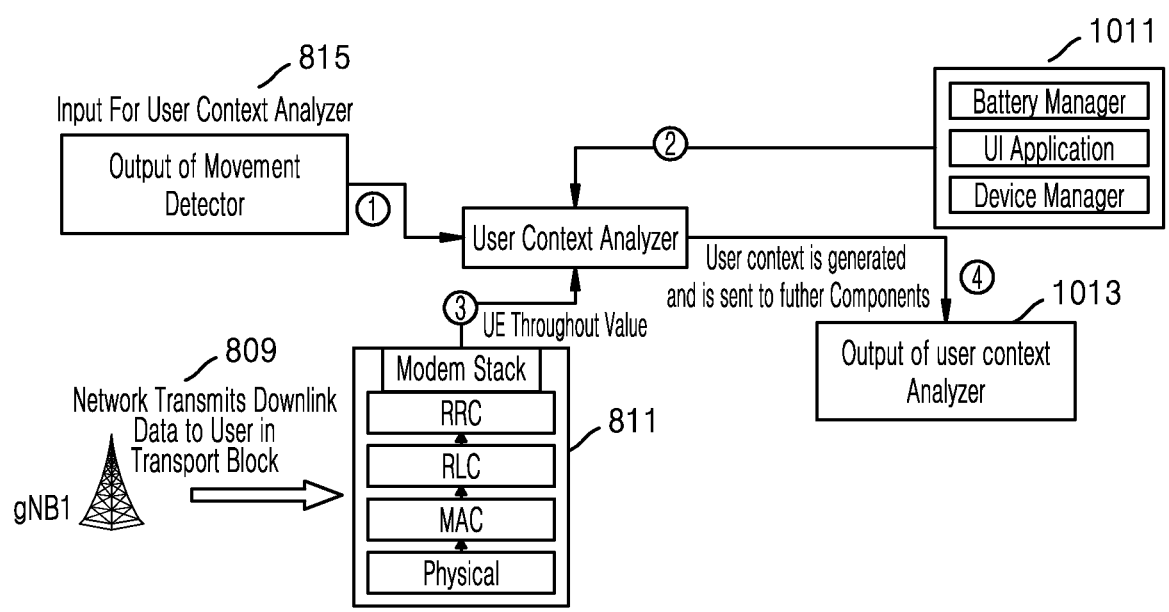
FIG. 10 shows a detailed working of the user context analyzer, according to an embodiment of the disclosure.

FIG. 10 shows operations of the user context analyzer, according to an embodiment of the disclosure. According to an embodiment, the user context analyzer 703 may be configured to determine personalized data of the user (the user personalized data) based on one or more user contextual parameters. The one or more contextual parameters may include at least one of call schedules of the user, calling preferences of the user, ongoing call type of the user, estimated battery life during the movement of the UE, a throughput value of the UE, path preferences of the user, historical activity data of the user, user's last location, and the like.

In FIG. 10, the GPS coordinate of UE 101 (at block 815 of FIG. 8) is inputted to the user context analyzer 703. Further, the throughput value of UE 101 may be obtained from the network 809 via the modem 811. Other user contextual parameters like the schedules of the user, the calling preferences of the user, the ongoing call type of the user, the estimated battery life during the movement of UE 101, the path preferences of the user, the historical activity data of the user, and the user's last location may be obtained from the applications 1011 installed in UE 101 or from the sensors of UE 101. For example, the applications may include a battery manager, UI applications, a device manager, databases of UE 101, a memory of UE 101, and the like. As an example, when UE 101 is moving from point 1 to point 2 (as shown in FIG. 9) and, throughout the path, there are various points A, B, and C, then UE 101 may obtain the following user contextual parameters:

- An input from the movement detector about the user's movement (point A).
- An estimated battery life from the battery Manager of device (point B).
- An identified type of a call (a voice call or a video call) from an application layer (point B).
- Identified route preferences from a path history of the user from the device manager (point B).
- A throughput value of the UE from the device modem (point C).

After obtaining the user contextual parameters, the user context analyzer 703 may be configured to determine the personalized data of the user based on the obtained plurality of user contextual parameters and the detected movement of UE 101. Thus, the user context analyzer 703, as an example, may output an analysis of the user personalized data as shown in table 3 below and block 1013 in FIG. 10.

TABLE 3

| User Personalized Data | Value |
| --- | --- |
| Data Throughput Requirement | High |
| Calling Preference | No Call |
| Estimated battery life | 6 hour |
| Preferred Route | (x1, y1), (x2, y2), (x3, y3) |
| Travel Date | 25 May 2022 |

Figure 11A:
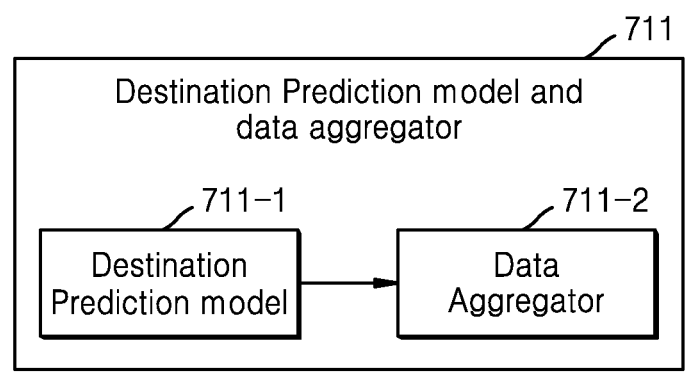
FIGS. 11A, 11B and 11C show a detailed block diagram and working of the destination prediction model and data aggregator, according to an embodiment of the disclosure.
Figure 11B:
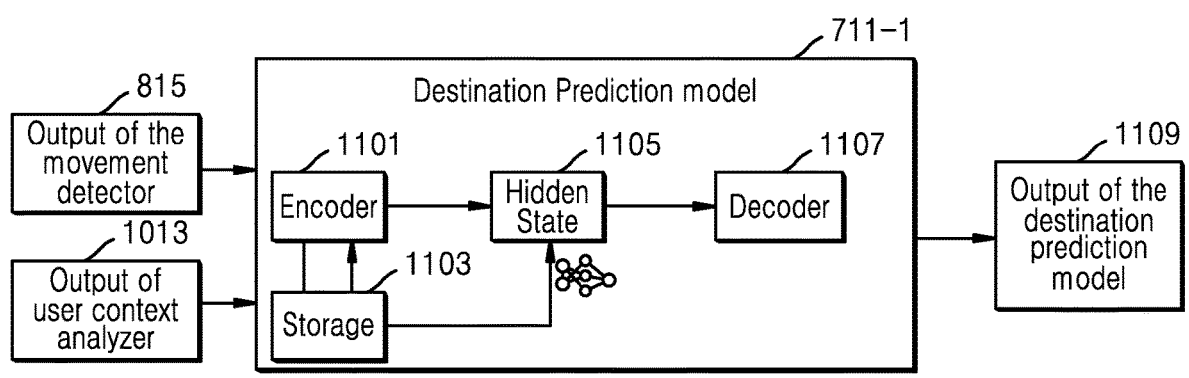
Figure 11C:
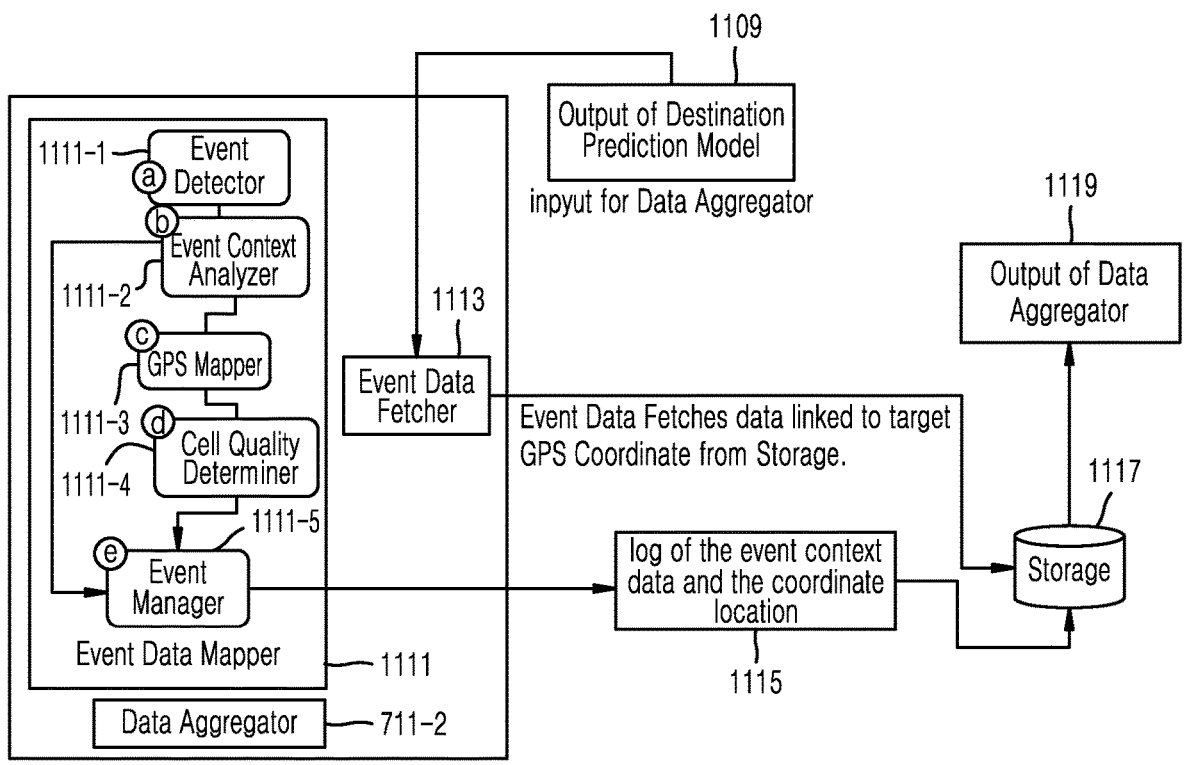

FIGS. 11A, 11B and 11C show a detailed block diagram and operations of the destination prediction model 711-1 and the data aggregator 711-2. The destination prediction model 711-1 predicts a destination of the user and one or more target cells across the path of the user to the destination, based on the personalized data and the detected movement of UE 101. Further, the data aggregator 711-2 outputs a mapping of a current target cell from the one or more target cells and a current serving cell during the movement of UE 101 across the path of the user to the destination. Now as UE 101 moves, a (current) serving cell is changed accordingly.

Referring to FIG. 11B, the destination prediction model 711-1 may include an encoder 1101, a hidden state 1105, a decoder 1107 and a storage 1103. According to an embodiment, the output of the movement detector 815 and the output of user context analyzer 1013 are provided as an input to the destination prediction model 711-1. In particular, as a movement of UE 101 is detected, the GPS coordinates, i.e. the output of the movement detector 815, are provided to the encoder 1101. The encoder 1101 updates the coordinates in the storage 1103. The encoder 1101 also fetches a location of past trajectory from the storage 1103. For example, the encoder 1101 updates coordinate point (xp, yp) in the storage 1103, and loads past location coordinates. The encoder 1101 also makes a fixed length vector in which the location is embedded. In particular, the encoder 1101 adaptively extracts features of the past trajectory and learns the movement pattern of the vehicle from the personalized data. The output of the encoder is provided as an input to the hidden state 1105. The hidden state 1105 receives historical information from the storage 1103. The hidden state 1105 represents a feature vector of the past location of UE 101, which is provided to the decoder 1107. For example, the hidden state 1105 could be hidden layers of neural network used in the AI model. The decoder 1107 uses the learned knowledge to predict the destination coordinates on its path. According to the embodiment, an example of the output of the destination prediction model 1109 is shown in table 4 below.

TABLE 4

| Destination GPS Coordinates |
| --- |
| xf, yf |

Further, the predicted destination of the user includes coordinates associated with the destination of the user and the one or more target cells.

FIG. 11C shows a detailed block diagram and operations of the data aggregator 711-2. According to an embodiment, the data aggregator 711-2 includes the event data mapper 1111 and the event data fetcher 1113. According to an embodiment, the event data mapper 1111 performs the mapping of a source cell and a target cell for the identified GPS coordinates and also stores one or more network quality parameters in the storage 1117. Further, the event data fetcher 1113 fetches information about the target cell from the stored information in event data mapper 1111. In a non-limiting example, the information about one or more target cells includes at least one of a frequency, the Reference Signal Received Power (RSRP) of the one or more target cells, and the Physical Cell identification Information (PCI ID). In a non-limiting example, the one or more network quality parameters include at least one of a network load, radio frequency (RF) link imbalance, radio access technology (RAT) information, and a size of the target cell.

According to an embodiment, the event data mapper 1111 includes the event detector 1111-1, the event context analyzer 1111-2, the GPS mapper 1111-3, the cell quality determiner 1111-4, and the event manager 1111-5. According to an embodiment, after detecting a cell mobility event by the movement detector 701, the event detector 1111-1 may be configured to identify one or more triggering points at instances where the movement of UE 101 is detected. According to the embodiment, the one or more triggering points corresponds to the tracked geographical location during the movement of UE 101. The event detector 1111-1 detects the cell mobility event by measuring the RSRP value from the source cell.

Figure 12:
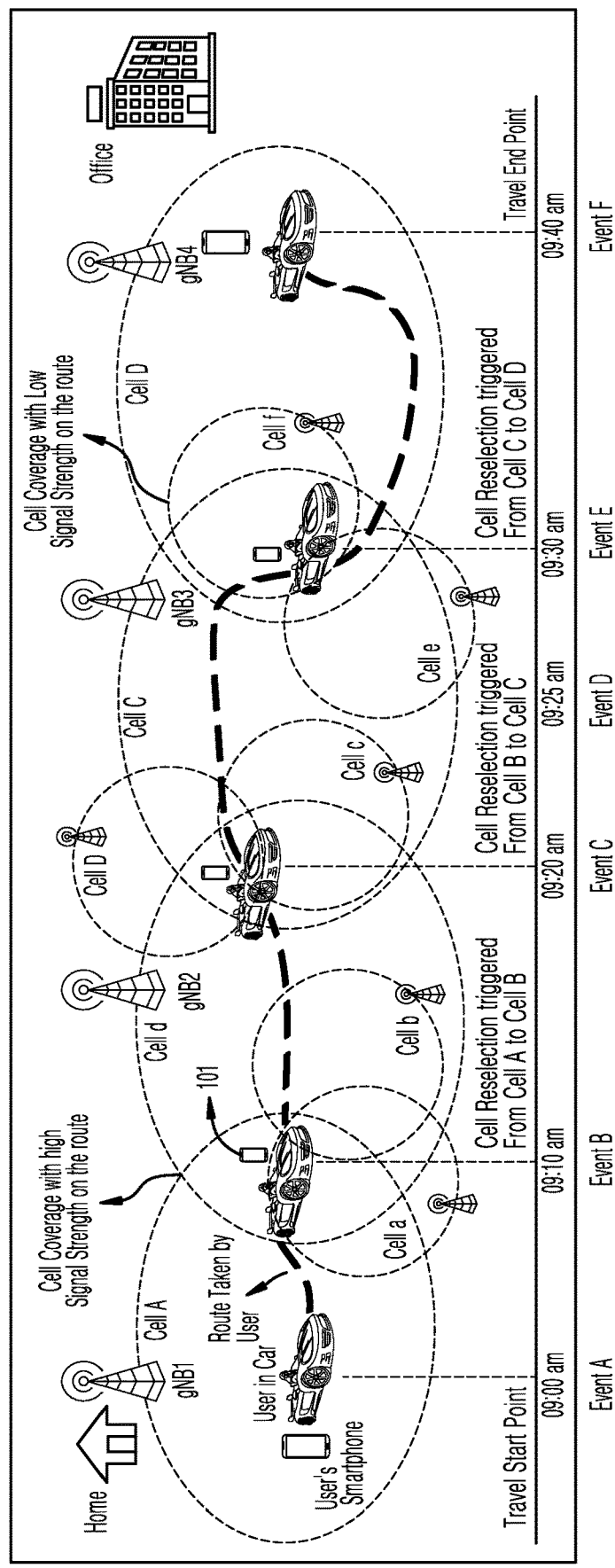
FIG. 12 shows an example scenario showing various triggering points while UE 101 is in movement.

FIG. 12 shows an example scenario of various triggering points while UE 101 is in movement. In FIG. 12, events A, B, C, D, E and F are detected at various time instances for the corresponding triggering points of the tracked geographical location of UE 101. Thereafter, based on the identified one or more triggering points during the movement of the UE, the event context analyzer 1111-2 may be configured to obtain event context data for each of the current target cells and the current serving cells at the identified one or more triggering points during the movement of UE 101. The event context data includes the information about one or more target cells. The event context analyzer 1111-2 fetches the event context data from the modem for each detected event point. Further, the event context analyzer 1111-2 stores the serving cell and the target cell information for the detected cell mobility event. An example of the event context data for each detected event point is shown in table 5 below.

TABLE 5

| Event A context | Event B context | Event C context |
|---|---|---|
| Serving Cell ID: A | Serving Cell ID: B | Serving Cell ID: C |
| Serving Cell Frequency: F1 | Serving Cell Frequency: F2 | Serving Cell Frequency: F3 |
| Target Cell ID: B | Target Cell ID: C | Target Cell ID: D |
| Target Cell Frequency: F2 | Target Cell Frequency: F3 | Target Cell Frequency: F4 |
| Target Cell RAT: 5G | Target Cell RAT: 5G | Target Cell RAT: 5G |
| Serving Cell RAT: 5G | Serving Cell RAT: 5G | Serving Cell RAT: 5G |
| Avg. Signal Strength of Target Cell: −80 dbm | Avg. Signal Strength of Target Cell: −85 dbm | Avg. Signal Strength of Target Cell: −75 dbm |

After obtaining the event context data, the GPS mapper 1111-3 may be configured to obtain a location of each of the identified one or more triggering points based on the sensor data. An example of the obtained location of each of the identified one or more triggering points is shown in table 6 below.

TABLE 6

| Event A | Event B | Event C |
|---|---|---|
| GPS location: (xp, yp) | GPS location: (xi, yi) | GPS location: (xj, yj) |

Thereafter, the cell quality determiner 1111-4 may be configured to calculate the one or more network quality parameters of the (current) target cells at the identified one or more triggering points during the movement of UE 101. In a non-limiting example, the cell quality determiner 1111-4 determines a network load, RF Link imbalance, a cell size and the like. Accordingly, the cell quality determiner 1111-4 may be configured to calculate the network load by getting network scheduling information from the modem, when the cell mobility event is detected. In another example, the cell quality determiner 1111-4 may be configured to determine the RF Link imbalance by calculating a redundancy of transport blocks. In yet another example, the cell quality determiner 1111-4 may be configured to determine the size of the network cell by calculating time and a speed to detected mobility event point. An example, outputs of the cell quality determiner 1111-4 are shown in table 7 as below.

TABLE 7

| Parameters | Value |
|---|---|
| Network Load | High |
| RF link imbalance | Low |
| Cell Size | Low |

After calculating the network quality parameter, the event manager 1111-5 may be configured to perform the mapping of the (current) target cell and the (current) serving cell at the triggering point of the identified one or more triggering points to generate a log of event context data and the location of each of the identified one or more triggering points 1115. The event manager 1111-5 may be configured to store a log of event context data along with the location at the memory/storage 1117 of UE 101. The stored data is used by the event data fetcher 1113 to identify the target cell linked with the identified destination coordinates point. An example of the generated log of the event context data and the location is shown in table 8 at the end of this paragraph. Thus, the event data fetcher 1113 may be configured to fetch at least information about one or more target cells among the one or more target cells and the one or more network quality parameters of the one or more target cells based on the prediction of the destination prediction model 1109.

TABLE 8

| Target Cell | Source cell Parameters | Target cell Parameters | Cell Size | Cell Load | RF Link imbalance | GPS Coordinates |
|---|---|---|---|---|---|---|
| B | ID: A Frequency: F1 RSRP = −95 dbm | ID: B Frequency: F2 RSRP = −80 dbm | Small | Low | Low | (xf, yf) |

According to an embodiment, the cell candidate trainer 705 may be configured to utilize a trained (on-device) AI model for target cell selection using the one or more network quality parameters and assigning them a fixed weight as per the neural network methodologies. The (on-device) AI model is implemented in UE 101. Accordingly, the one or more network quality parameters are inputted to the (on-device) AI model as a hot encoding of the one or more network quality parameters as training data for training the (on-device) AI model. According to the embodiment, the hot encoding of the one or more network quality parameters is generated based on an encoding of the one or more network quality parameters along with the path of the user to the destination based on the movement of UE 101. As explained above the input features for the (on-device) AI model may be network load, RF link imbalance, cell size, RSRP are inputted as vectors.

The (on-device) AI model may be trained by conversion of all the network quality parameters into vector and then combining it with updated weights. In particular, the cell candidate trainer 705 trains the (on-device) AI model by assigning a weight to each of the one or more network quality parameters based on the inputted hot encoding of the one or more network quality parameters. Thus, the cell candidate trainer 705 outputs probability of a high class, probability of mid class and a probability of low class of the one or more network quality parameters with a fixed weight assigned to each of the network parameter. As an example, the output of the cell candidate trainer 705 is shown in table 9 below.

TABLE 9

| Network Parameter | AI Weights |
|---|---|
| NW Load | W1 |
| RSRP | W2 |
| RF link Imbalance | W3 |
| Cell Size | W4 |

Figure 13:
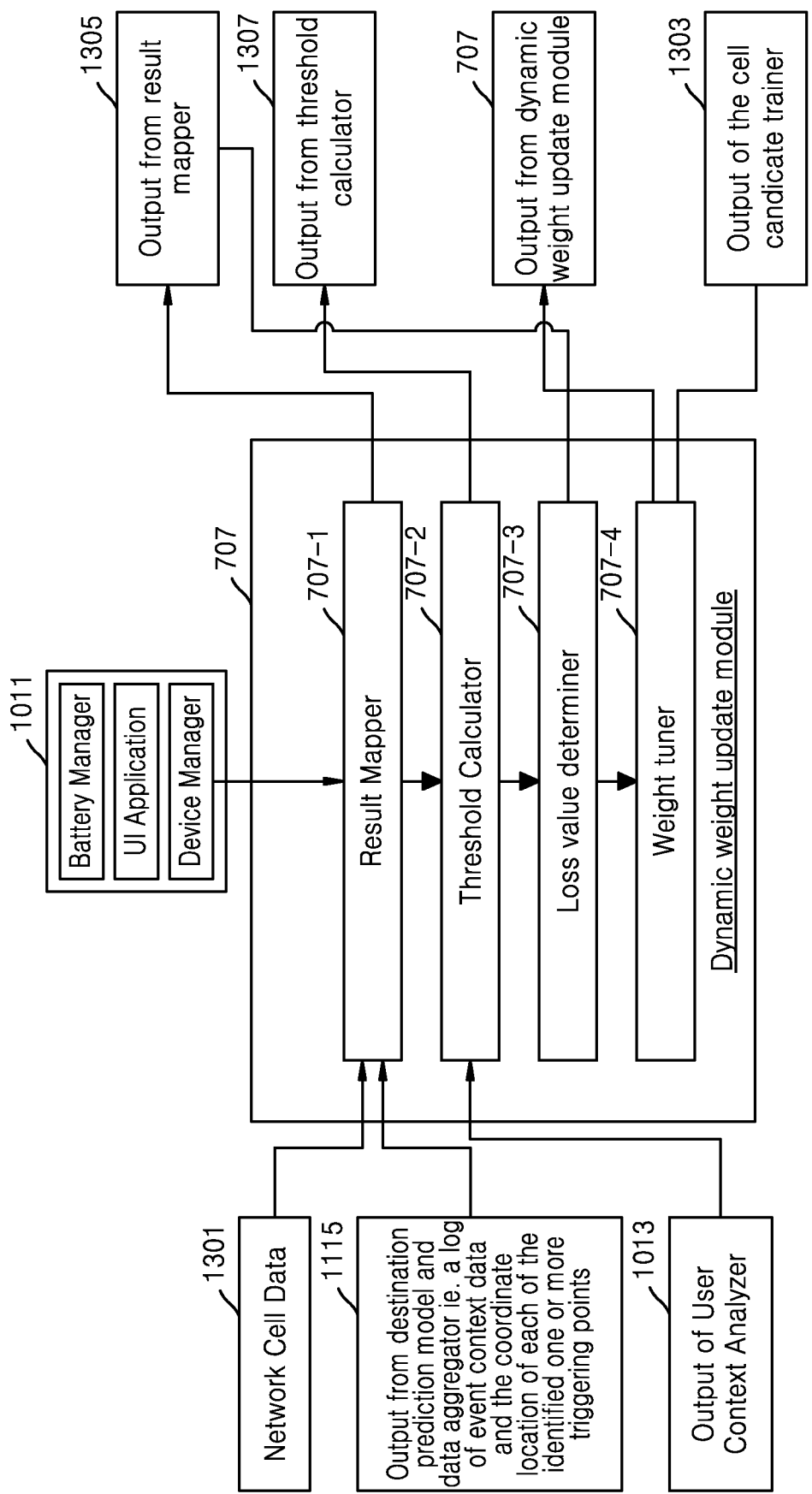
FIG. 13 shows a dynamic weight update module according to an embodiment of the disclosure.

FIG. 13 shows a dynamic weight update module according to an embodiment of the disclosure. The dynamic weight update module 707 includes a result mapper 707-1, threshold calculator 707-2, loss value determiner 707-3, and weight tuner 707-4. The dynamic weight update module 707 may be configured to (dynamically) training of the (on-device) AI model based on the trained (on-device) AI model, the target cell information, the one or more network quality parameters and the user personalized data. A detailed working of the dynamic weight update module 707 for (dynamically) training of the (on-device) AI model will be explained below.

According to an embodiment, the result mapper 707-1 fetches a network cell data 1301, the output from destination prediction model and data aggregator i.e. the log of event context data and the location of each of the identified one or more triggering points 1115, the output of the user context analyzer 1013, user contextual parameters obtained from various application 1011. The result mapper 707-1 maps each of the network cell data of the target cells with each of the target cells. In a non-limiting example, the network cell data 1301 includes call drop, BLER/SINR and the like. An example output of the result mapper 707-1 is shown in table 10 below.

TABLE 10

| Result Parameter | Value |
|---|---|
| Battery Consumption | X1 |
| Number of Call Drop | X2 |
| BLER/SINR | X3 |
| Throughput achieved/ Throughput Required | X4 |

The result of the output of the result mapper 707-1 is provided to the threshold calculator 707-2. According to an embodiment of the disclosure, the threshold calculator 707-2 receives the output of the user context analyzer 1013. The threshold calculator 707-2 may be configured to calculate a threshold value for each of the personalized data of the user by using an AI model (e.g., a regression model). The threshold calculator 707-2 uses an AI model (e.g., a logistic regression model). The logistic regression model predicts the output of a categorical dependent variable using a given set of dependent variable. An example output of the threshold calculator 707-2 is shown in table 11 below. Thus, the threshold value is calculated for each user personalized data.

TABLE 11

| User Personalized Data | Threshold |
|---|---|
| Data Throughput Requirement | T1 |
| Calling Preference | T2 |
| Estimated battery life | T3 |
| Estimated time to Arrival | T4 |

Thereafter, the output of the output from the result mapper 1305 and the output from the threshold calculator 1307 are provided as inputs to the loss value determiner 707-3. The output from the result mapper 1305 depicts a result parameter that is mapped onto the target cells. The loss value determiner 707-3 may be configured to calculate a loss value based on the calculated threshold value and mapped each of the network cell data of the target cells with each of the target cells. The loss value determiner 707-3 may be configured to apply the calculated loss value on the trained (on-device) AI model. Thereafter, the weight tuner 707-4 may be configured to dynamically updating the weight for each of the one or more network quality parameters based on the calculated threshold value. Thus, the weights that are dynamically updated minimize the loss value. An example output of the dynamically updated weights 707 by the weight tuner 707-4 is given in table 12 below.

TABLE 12

| Network Parameter | AI Weights |
|---|---|
| NW Load | W1 |
| RSRP | W2 |
| RF Link Imbalance | W3 |
| Cell Size | W4 |

In one embodiment, the cell candidate determiner 709 may be configured to selecting a target cell from one or more target cells based on the (dynamically) updated weight for each of the one or more network quality parameters by the (dynamically) trained (on-device) AI model.

Figure 14:
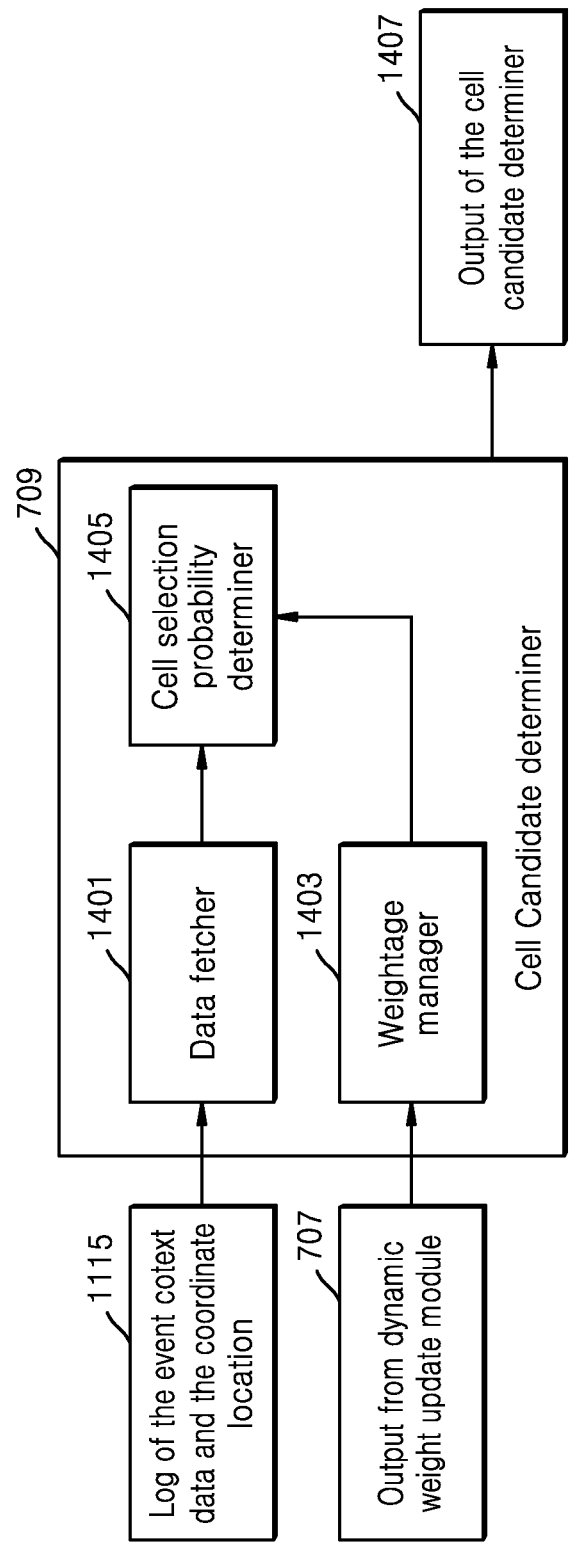
FIG. 14 shows a cell candidate determiner 709 and its working according to an embodiment of the disclosure.

FIG. 14 shows a cell candidate determiner 709 and its operations according to an embodiment of the disclosure. The cell candidate determiner 709 includes three components, i.e. the data fetcher 1401, the weight manager 1403, and the cell selection probability determiner 1405. The data fetcher 1401 fetches the generated log of the event context data and the location from the destination prediction model 711-1. A target network cell is selected on the basis of the one or more network quality parameters, as every parameter will affect the quality of the target cell. The weight manager 1403 dynamically updates the weight of network parameters that is output from the dynamic weight updating module 707 in a neural network (NN). In particular, the dynamic weight updating module 707 updates the dynamic weight of Network parameters in the NN. The weight of the network parameters are, thus, dynamically updated by the dynamic weight updating system on the basis of the user personalized data. This may help in providing advantageous technical effect in finding an appropriate cell by updating the dynamic weight of parameters in NN. According to an embodiment, the cell selection probability determiner 1405 uses the NN to identify the cell selection probability based on dynamic weights of network parameters. The cell probability determiner 1405 uses (on-device) AI model to determine a cell selection probability of fetched cells as per the weight received from the weight manager 1403 and the network quality parameter values received from the data fetcher 1401. Both the one or more network quality parameters and the dynamic weight assigned to them will be used in (on-device) AI model to identify the cell selection probability. Out of fetched cells, a cell having the maximum probability will be selected by UE 101 as an appropriate cell.

Figure 15:
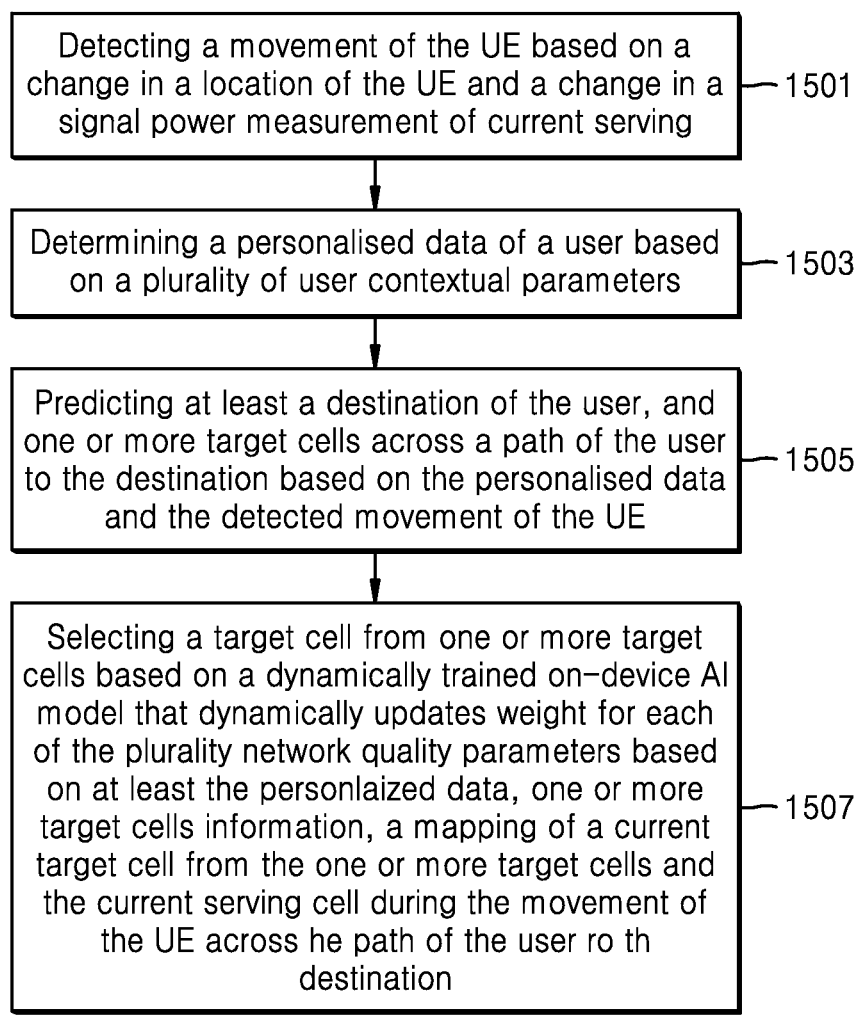
FIG. 15 illustrates a flow chart for selecting a target cell while a user equipment (UE) is moving according to an embodiment of the disclosure.

FIG. 15 illustrates a flow chart for selecting a target cell by UE 101, for example, while the UE 101 is moving according to an embodiment of the disclosure. The work flow 1500 may be implemented in the system 600. An explanation of the work flow 1500 has been given with respect to FIGS. 6-14, therefore, detailed explanation of the same has been omitted here for the sake of brevity. According to an embodiment, the work flow 1500 may be performed by the processor 601 or any of the modules as disclosed above through FIGS. 6-14.

At operation 1501, the work flow 1500 includes detecting a movement of UE 101 based on a change in a location of UE 101 and a change in a measured signal power of a current serving cell. Thereafter, at operation 1503, the work flow 1500 includes determining personalized data of a user based on a plurality of user contextual parameters.

After identification, at operation 1505, the work flow 1500 includes predicting a destination of the user and one or more target cells across a path of the user to the destination based on the personalized data and the detected movement of UE 101.

Thereafter, at operation 1507, the work flow 1500 includes selecting a target cell from one or more target cells based on a dynamically trained (on-device) AI model that dynamically updates a weight for each of the one or more network quality parameters based on at least one of the personalized data, information about one or more target cells, and a mapping of a (current) target cell from the one or more target cells and a (current) serving cell during the movement of the UE across the path of the user to the destination.

Figure 16:
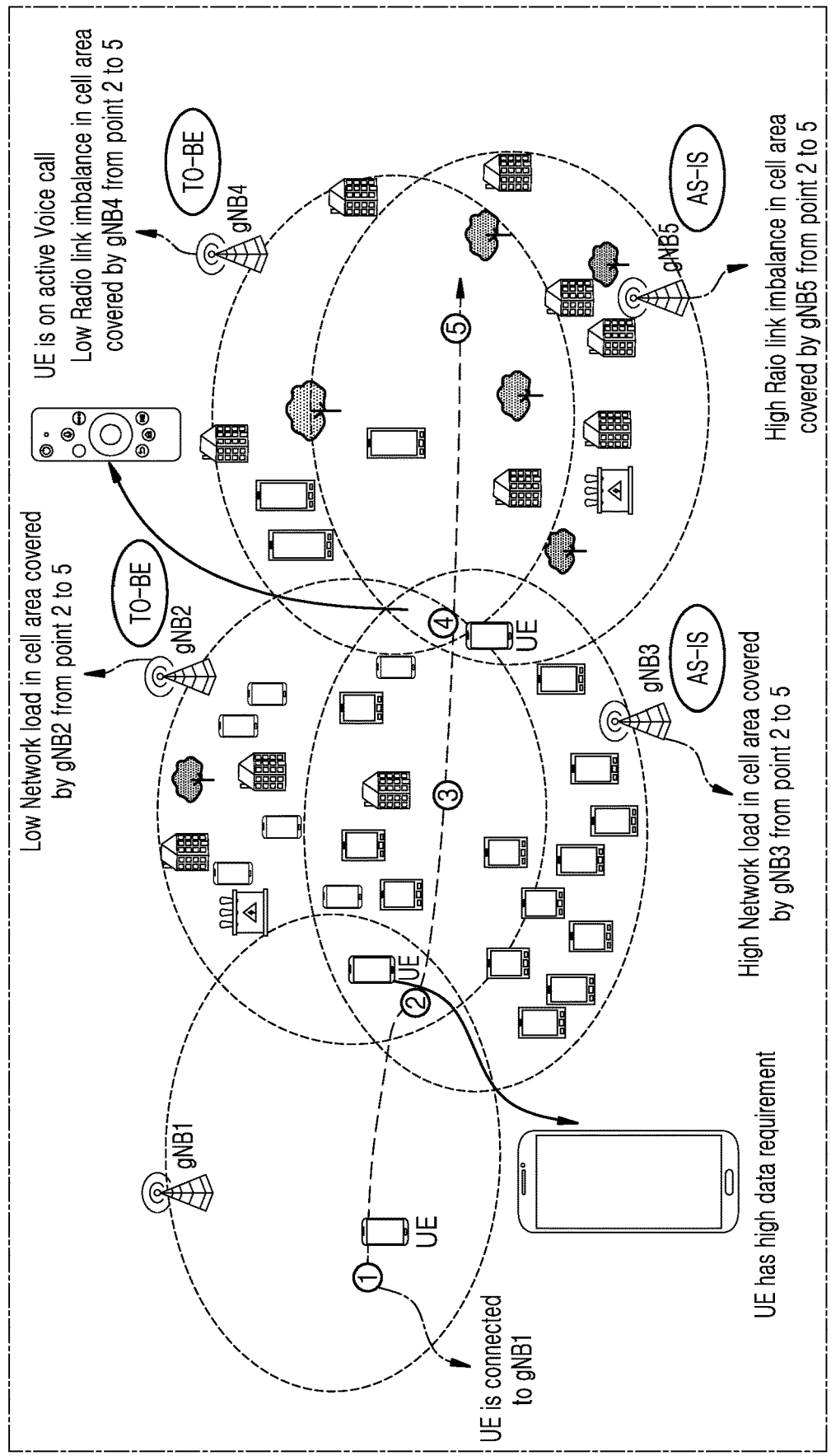
FIG. 16 shows an example scenario depicting a comparison of the present methodology with a conventional method, according to an embodiment of the disclosure.

FIG. 16 shows an example scenario depicting a comparison of the present methodology with a conventional method, according to an embodiment of the disclosure. As shown in FIG. 16, the user is moving from the source point 1 to the destinations point 5 through points 2, 3, and 4. In an example scenario, at point 2, the user is watching online video which requires high data. So, a UE should re-select to gNB2 as a load of gNB2 is lower than and RSRP of gNB2 is better that those of gNB3. Further, at point 4, the user is active on a voice call, so the UE should reselect to gNB4 as RF link imbalance of gNB4 is lower than that of connecting gNB5 having high radio link imbalance, but RSRP is better than gNB4. According to the conventional method, at point 2, gNB3, and, at point 4, gNB5 will be selected. However, based on the implementation of the disclosed method, the UE may select gNB2 and gNB4. Accordingly, the user gets high data throughput by selecting gNB2 based on the requirement of user, as gNB2 has a lower load than gNB3. Further, a call drop of the voice call may be reduced by selecting gNB4 as gNB4 has low RF link imbalance. The network cell resources may be optimized properly and the UE may have high data throughput, a low call drop of the voice call due to the above cell selection procedure.

Figure 17:
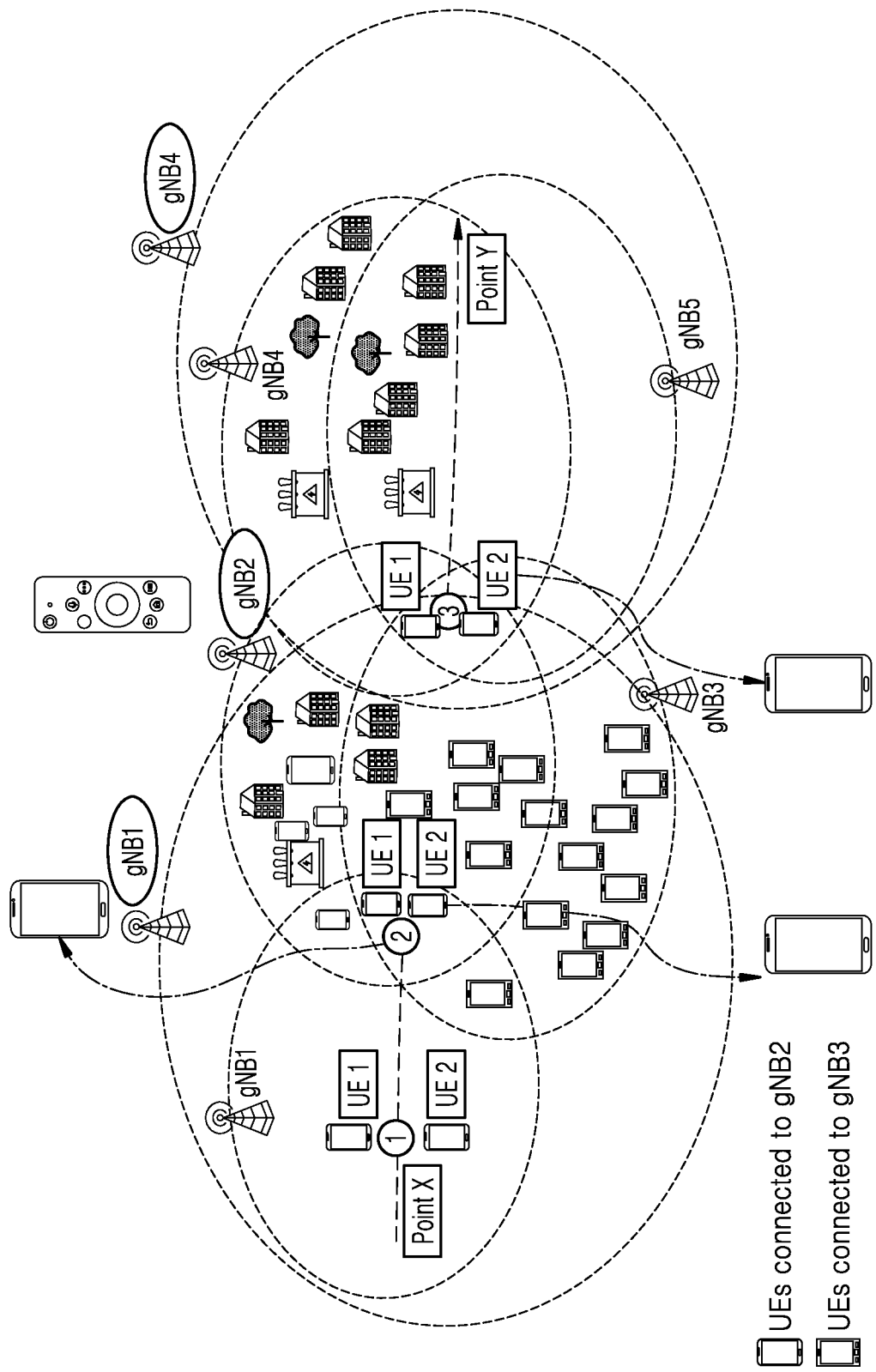
FIG. 17 shows an another example scenario where UEs have different personalized requirements during the path to destination, according to an embodiment of the disclosure.

FIG. 17 shows an another example scenario where UEs have different personalized requirements during the path to destination, according to an embodiment of the disclosure. As shown in FIG. 17, UE1 and UE2 are moving from Source X to Destination Y through points 1, 2 and 3. At point 1, both of UE1 and UE2 are connected to gNB1 initially. At point 2, UE1 is having low battery and UE2 requires high data throughput. Thus, according to an embodiment, the UE1 connects to eNB1, so it reduces a number of cell selections as compared to gNB3 because a size of a LTE cell is greater than a size of 5G NR cell. Further, the UE2 connects to gNB2 as it has a low network load as compared to gNB3. At point 3, UE1 and UE2 are on an active voice call so it will connect to gNB4 due to low RF link imbalance than gNB5. Therefore, according to an embodiment, both of UE1 and UE2 select a network cell on the basis of their respective user requirements where weights are updated dynamically with each of the user requirements.

Thus, according to an embodiment, UE1 and UE2 get low call drops on cell gNB4 due to low RF link imbalance. Further, the UE2 gets higher data throughput due to the selection of gNB2 having a less network load. Further, a battery optimization is also achieved by selecting eNB1 by the UE1 due to a lower number of cell selection as the size of the LTE cell is greater than the size of the 5G NR cell. Further, network cell resources may be optimized due to the cell selection based on user specific requirements.

Accordingly, the following may be technical effects achieved in embodiments of the disclosure:

A UE gets high data throughput.
Reduction in call drop by selecting an appropriate cell as it has low RF link imbalance.
Network cell resources get optimized properly
Low voice drop due to appropriate cell selection
The UE selects network cell on the basis of user requirement and accordingly weights are updated dynamically.
Network cell resources may be optimized due to the cell selection based on user specific requirements.

Some example embodiments disclosed herein may be implemented using processing circuitry. For example, some example embodiments disclosed herein may be implemented using at least one software program running on at least one hardware device and performing network management functions to control the elements.

While specific language has been used to describe the disclosure, any limitations arising on account of the same are not intended. As would be apparent to a person in the art, various working modifications may be made to the method in order to implement the embodiments as described herein.

The drawings and the forgoing description are example embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for selecting a target cell by a user equipment (UE), the method comprising:
   detecting a movement of the UE based on a change in a location of the UE and a change in measured signal power of a serving cell;
   determining personalized data of a user based on a plurality of user contextual parameters;
   predicting a destination of the user, and
   one or more target cells across a path of the user to the destination based on the determined personalized data of the user and the detected movement of the UE; and
   selecting the target cell from the one or more target cells, based on an artificial intelligence (AI) model,
   wherein the AI model is configured to update a weight for each of one or more network quality parameters, based on at least one of:
      the determined personalized data,
      information on the one or more target cells, and
      a mapping of the target cell from the one or more target cells and the serving cell across the path of the user to the destination.

2. The method of claim 1, further comprising:
   tracking the change in the location of the UE and a geographical location of the UE, based on sensor data;
   obtaining information about the measured signal power of the serving cell from a network;
   determining the change in the measured signal power of the serving cell by comparing the measured signal power of the serving cell with a threshold value, the measured signal power of the serving cell being lower than the threshold value; and
   detecting the movement of the UE based on the determined change in the measured signal power of the serving cell and the tracked geographical location of the UE,
   wherein the tracked geographical location of the UE is stored in a memory.

3. The method of claim 1, further comprising:
   obtaining the plurality of user contextual parameters from at least one of the UE and the network; and
   determining the personalized data of the user based on the obtained plurality of user contextual parameters and the movement of the UE,
   wherein the plurality of user contextual parameters comprises at least one of:
      call schedules of the user,
      calling preferences of the user,
      an ongoing call type of the user,
      an estimated battery life,
      a throughput value of the UE,
      a preference of the path of the user,
      historical activity data of the user, and
      a last location of the user.

4. The method of claim 1, further comprising fetching information about one or more target cells among the one or more target cells, and the one or more network quality parameters of the one or more target cells based on the prediction,
   wherein the predicted destination of the user comprises coordinates associated with the destination of the user, and the one or more target cells.

5. The method of claim 4, wherein the information about one or more target cells comprises at least one of a frequency, Reference Signal Received Power (RSRP) of the one or more target cells, and Physical Cell identification Information (PCI ID).

6. The method of claim 4, wherein the one or more network quality parameters comprises at least one of a network load, radio frequency (RF) link imbalance, radio access technology (RAT) information, and a size of the target cell.

7. The method of claim 4, further comprising:
   identifying one or more triggering points at instances where the movement of the UE is detected, the one or more triggering points corresponding to the tracked geographical location;
   obtaining event context data for each of the one or more target cells and serving cells at the identified one or more triggering points, the event context data comprising the information about one or more target cells;
   obtaining a location of each of the identified one or more triggering points based on sensor data;
   calculate the one or more network quality parameters of the one or more target cells at the identified one or more triggering points;
   performing the mapping of the target cell and the serving cell at a triggering point of the identified one or more triggering points to generate a log of event context data and the location of each of the identified one or more triggering points; and
   storing the log of event context data along with the location at a memory of the UE.

8. The method of claim 1, further comprising:
   inputting, in the AI model, a hot encoding of the one or more network quality parameters as training data for training the AI model;
   generating the hot encoding of the one or more network quality parameters based on an encoding of the one or more network quality parameters along with the path of the user to the destination based on the movement of the UE; and
   training the AI model and obtaining a trained AI model by assigning the weight to each of the one or more network quality parameters based on the inputted hot encoding of the one or more network quality parameters.

9. The method of claim 7, further comprising training of the AI model based on at least one of the trained AI model, information on the target cell, the one or more network quality parameters, and personalized data,
   wherein the training of the AI model comprises:
      calculating a threshold value for each of the personalized data of the user by using a regression model;
      calculating a loss value based on the generated log of event context data and the calculated threshold value;
      applying the calculated loss value on the trained AI model; and
      updating the weight for each of the one or more network quality parameters based on the calculated threshold value.

10. A user equipment (UE) for selecting a target cell, comprising:
    one or more processors configured to:
       detect a movement of the UE based on a change in a location of the UE and a change in measured signal power of a serving cell;
       determine personalized data of a user based on a plurality of user contextual parameters;

predict a destination of the user, and one or more target cells across a path of the user to the destination based on the personalized data and the detected movement of the UE; and select the target cell from one or more target cells based on a trained AI model that updates a weight for each of the one or more network quality parameters based on at least one of the personalized data, information about one or more target cells, and a mapping of the target cell from the one or more target cells and the serving cell, across the path of the user to the destination based on training data and the prediction.

11. The UE of claim 10, wherein the one or more processors are further configured to:

track for the change in the location, a geographical location of the UE, based on sensor data;

obtain information about the measured signal power of the serving cell from a network;

determine the change in the measured signal power of the serving cell by comparing the measured signal power of the serving cell with a threshold value, the measured signal power of the serving cell being lower than the threshold value; and detect the movement of the UE based on the determination of the change in the measured signal power of the serving cell and the tracked geographical location of the UE, wherein the tracked geographical location of the UE is stored in a memory.

12. The UE of claim 11, wherein the one or more processors are further configured to:

obtain the plurality of user contextual parameters from at least one of the UE and the network, and determine the personalized data of the user based on the obtained plurality of user contextual parameters and the detected movement of the UE, wherein the plurality of user contextual parameters comprises at least one of:
call schedules of the user,
calling preferences of the user,
ongoing call type of the user,
estimated battery life,
a throughput value of the UE,
a preference of the path of the user,
historical activity data of the user, and
a last location of the user.

13. The UE of claim 10, wherein the one or more processors are further configured to:

fetch at least one of (i) information about one or more target cells among the one or more target cells and (ii) the one or more network quality parameters of the one or more target cells, based on the prediction, wherein the predicted destination of the user comprises coordinates associated with the destination of the user and the one or more target cells.

14. The UE of claim 10, wherein the information about one or more target cells comprises at least one of a frequency, Reference Signal Received Power (RSRP) of the one or more target cells, and Physical Cell identification Information (PCI ID).

15. The UE of claim 10, wherein the one or more network quality parameters comprises at least one of a network load, radio frequency (RF) link imbalance, radio access technology (RAT) information, and a size of the target cell.

16. The UE of claim 13, wherein the one or more processors are further configured to:

identifying one or more triggering points at instances where the movement of the UE is detected, the one or more triggering points corresponding to the tracked geographical location;

obtaining event context data respective of the one or more target cells and one or more serving cells at the identified one or more triggering points, the event context data comprising the information about one or more target cells;

obtaining a location of each of the identified one or more triggering points based on sensor data;

calculate the one or more network quality parameters of the one or more target cells at the identified one or more triggering points;

performing the mapping of the target cell and a serving cell at a triggering point of the identified one or more triggering points to generate a log of event context data and the location of each of the identified one or more triggering points; and storing the log of event context data along with the location at a memory of the UE.

17. The UE of claim 16, wherein the one or more processors are further configured to:

input, in the AI model, a hot encoding of the one or more network quality parameters as the training data for training the AI model;

generate the hot encoding of the one or more network quality parameters based on an encoding of the one or more network quality parameters along with the path of the user to the destination based on the movement of the UE; and train the AI model and obtain a trained AI model by assigning the weight to each of the one or more network quality parameters based on the inputted hot encoding of the one or more network quality parameters.

18. The UE of claim 17, wherein the one or more processors are further configured to perform a training of the AI model based on the trained AI model, target cell information, the one or more network quality parameters and personalized data, wherein the training of the AI model comprises:
calculate a threshold value for each of the personalized data of the user by using a regression model;
calculate a loss value based on the generated log and the calculated threshold value;
apply the calculated loss value on the trained AI model; and
update the weight for each of the one or more network quality parameters based on the calculated threshold value.

* * * * *